United States Patent [19]

Cohen

[11] Patent Number: 4,584,022
[45] Date of Patent: Apr. 22, 1986

[54] CEMENT PLANT DUST RECOVERY SYSTEM

[75] Inventor: Sidney M. Cohen, Allentown, Pa.

[73] Assignee: Fuller Company, Bethlehem, Pa.

[21] Appl. No.: 644,745

[22] Filed: Aug. 27, 1984

[51] Int. Cl.[4] .............................................. C04B 7/36
[52] U.S. Cl. ...................................... 106/100; 106/103
[58] Field of Search ................................. 106/100, 103

[56] References Cited

U.S. PATENT DOCUMENTS

| | | | |
|---|---|---|---|
| 2,477,262 | 7/1949 | Mooser | 106/100 |
| 2,687,290 | 8/1954 | Garoutte et al. | 106/100 |
| 3,622,363 | 11/1971 | Van Dornick | 106/100 |
| 3,870,534 | 3/1975 | Van Dornick | 106/100 |
| 4,173,487 | 11/1979 | Cohen | 106/103 |
| 4,249,952 | 2/1981 | Davis, Jr. et al. | 106/103 |
| 4,329,180 | 5/1982 | Herchenbach et al. | 106/100 |
| 4,367,095 | 1/1983 | Namy | 106/100 |

FOREIGN PATENT DOCUMENTS 152109 5/1951 Australia .............................. 106/100

Primary Examiner—William R. Dixon, Jr.
Assistant Examiner—Steven Capella
Attorney, Agent, or Firm—Frank H. Thomson

[57] ABSTRACT

A process of treating the dust catch from a cement manufacturing operation to produce either cement clinker or an intermediate product suitable for feed to a conventional cement clinker production facility. A biproduct of enriched alkali and sulfur compounds is also produced. The process includes a feed preparation stage where dust catch, coal or coke and a binder such as cement are combined. Additives to correct the material chemistry may also be added. This mixture is formed into nodules which are dried and then sized to form a feed material. The feed material is processed at or near cement clinkering temperatures in a fluidized bed reactor to volatilize alkali and sulfur compounds and products the intermediate product or cement clinker. Suitable heat recovery devices are utilized in the product cooling phase.

8 Claims, 3 Drawing Figures

CEMENT PLANT DUST RECOVERY SYSTEM

BACKGROUND OF THE INVENTION

This invention relates to a process for treating the dust catch from a cement manufacturing operation and to a system for utilizing the dust from a conventional cement plant operation for producing either cement clinker or a product which is suitable for return to the conventional clinker producing facility. Enriched alkali and sulfur compounds are produced as a biproduct.

Coventional cement clinker producing systems in use today normally consist of a rotary kiln into which raw materials for cement production are supplied to one end and fuel and combustion air supplied to the other end. The system may be in the form of a wet process or dry process and if the dry process may include a preheater system and perhaps a precalcining system. Exhaust gases from the rotary kiln will entrain fine particles of raw material being supplied to the pyroprocessing system of the cement plant. These fine particles of material will be collected in high efficiency dust collectors such as a fabric filter or electrostatic precipitator. The collected particles are referred to herein as "dust catch".

In some instances, this dust catch will be suitable for direct return to the kiln through a dust insufflation system well known in the art. In other applications, the dust catch may be returned to the raw meal blender of the cement plant where it is blended with other incoming feed material and then directed to the clinkering system.

Typically, the oxides of sodium and postassium, commonly referred to as alkalis, and oxides of sulfur contained in the cement raw meal of a conventional cement clinker production facility will be volatilized by the high temperature of the pyroprocessing system and will be concentrated in the dust catch. These compounds must be kept to a minimum in cement clinker and thus must be kept to a minimum in the raw meal. In addition, the dust catch may be comparatively low in certain cement forming compounds. As a result of this concentration of alkali and sulfur compounds and low level of cement forming compounds, the dust catch may be considered to be a waste product. Continued storage of the dust catch in piles adjacent to the cement plant becomes an environmental problem. It would be useful to find a means of utilizing the dust catch to produce a useful product, such as cement clinker, not only to save raw materials, but also to substantially reduce an environmental problem.

If the undesireable alkalis and sulfur compounds can be eliminated from the dust catch, the resultant product can either be used as a component in the manufacture of cement clinker or formed directly into cement clinker.

It should be noted that the dust catch is at least partially calcined material and its use in a cement clinker producing operation will eliminate the need to recalcined a portion of the raw material and thereby reduce the fuel requirement of a cement clinker producing process.

Prior to the present invention, methods were known for utilizing dust catch to produce cement clinker. One such system is shown in my prior U.S. Pat. No. 4,173,487 issued Nov. 6, 1979 wherein the dust catch is chemically adjusted, pelletized and then fed to a rotary kiln. In that process, the kiln is maintained under reducing conditions and at a high back end temperature. While this system produces an acceptable cement clinker from the dust catch of a conventional cement manufacturing operation, its use involves the heavy capital investment of a rotary kiln installation.

Other prior systems for treating cement plant dust catch include the addition of various compounds to the raw material such as the addition of calcium chloride as shown in U.S. Pat. No. 4,404,032 issued Sept. 13, 1983 or the addition of calcium fluoride as shown in U.S. Pat. No. 4,001,030 issued Jan. 4, 1977. Both of these compounds may be less than desireable as a component of the finished cement clinker and may not be readily available materials. The process of the present invention utilizes materials already available in existing cement manufacturing facilities.

Some dust catches are suitable for direct conversion to cement clinker once most of the alkali and sulfur compounds have been volitalized from of the raw mix, although some chemical adjustment may be required. The analysis of other dust catches may be such that it is not suitable to convert the dust catch directly to cement clinker but more appropriate to reduce the alkali and sulfur compounds to produce an intermediate product. This intermediate product is suitable for combination with other raw materials for supply to a conventional cement clinkering operation.

With the present invention, a fluidized bed apparatus is utilized for carrying out the thermal processing of the materials to volitalize alkali and sulfur compounds and produce either an intermediate product which may be used as a component in a conventional cement clinker producing system or the system may be used to produced a final cement clinder product. The product produced will depend upon the analysis of the dust catch being utilized as a feed material and upon the temperature at which the fluid bed will be operated. The alkali and sulfur compounds volatilized are enriched to the point of being a useful byproduct. The use of a fluidized bed system allows an economical system to be provided having lower capital cost then other known systems for treating cement plant dust catch.

SUMMARY

It is therefore the principal object of this invention to provide a process for treating cement plant dust catch which is capable of producing a product having suitable cement clinker forming compounds and enriched alkali and sulfur compounds as a byproduct.

It is a further object of this invention to provide a process of treating dust catch from a cement manufacturing operation which utilizes a fluidized bed apparatus for carrying out the production of either cement clinker or an intermediate product to be used in a cement clinkering operation and enriched alkali and sulfur compounds as a byproduct.

The foregoing and other objects will be carried out by providing a process of treating dust catch from a cement manufacturing operation comprising the steps of adding water, carbon bearing material and a binder to the dust catch from a cement manufacturing operation to form a mixture; forming the mixture into nodules; drying the nodules; sizing the nodules to obtain a feed material having a selected size range; establishing and maintaining within a vessel a fluidized bed of feed material by passing air for combustion upwardly through a bed of material; thermal processing the material within the fluidized bed at a temperature slightly less than cement clinkering temperture by supplying fuel for combustion to the fluidized bed to volitalize alkali and sulfur compounds in the feed material and produce a product having an increased concentration of cement forming compounds and reduced alkali and sulfur compounds compared to the feed material; discharging product by displacement from the vessel; discharging combustion gas; entrained product and volitalized alkali and sulfur compounds from the vessel; separating entrained product from the combustion gas; and condensing the volitalized alkali and sulfur compounds.

The feed preparation system of the present invention may take the form of either a pelletizing system or an extrusion system. The dust catch is blended with carbon bearing material such as coal and a binder which may be Portland Cement. This mixture is fed to the feed preparation system where nodules are produced and the nodules are sized in a crushing and screening system to produce a feed material having a size suitable for feed to a fluidized bed system. Feed material is then supplied to the fluid bed where it is processed either at cement clinkering temperature or sightly below cement clinkering temperatures to produce a product. Volitalized alkali and sulfur compounds are precipitated out of exhaust gases from the fluidized bed by the addition of bleed air. Exhaust gases are used for preheating the combustion air and the product heat is recovered as a drying gas for the wet pellets before feeding to the reactor system. In some cases, the excess heat after the above may be used to generate steam to produce electricity or operate steam driven motors to replace elctric drives in the system.

BRIEF DESCRIPTION OF THE DRAWINGS

The invention will be described in connection with the annexed drawings wherein.

DESCRIPTION OF THE PREFERRED EMBODIMENTS

Figure 1:
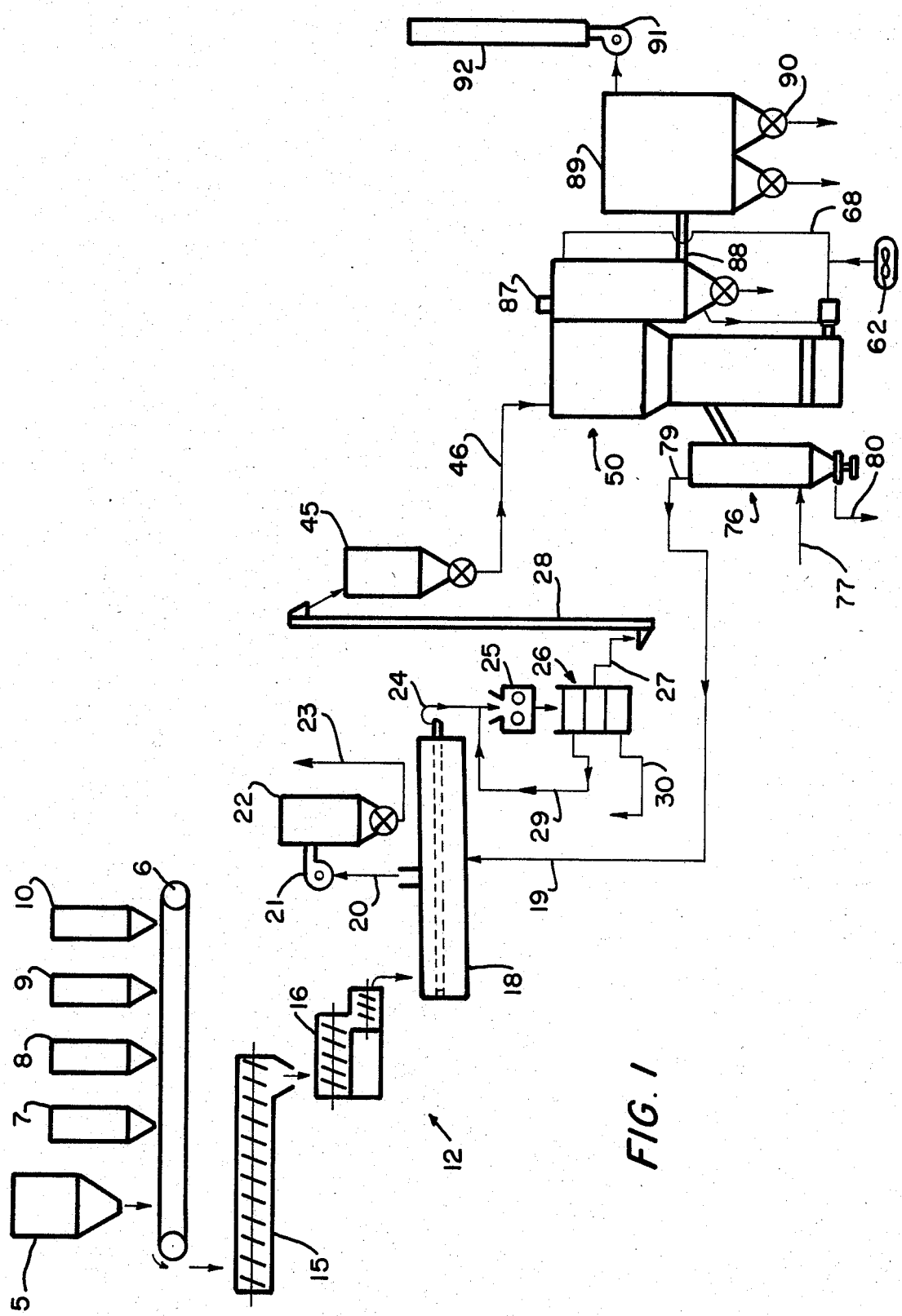
FIG. 1 is a diagramatic view of apparatus for carrying out the process of the present invention.

With the present invention, cement plant dust or dust catch is metered from a bin such as that illustrated at 5 in FIG. 1 onto a belt conveyor 6. Carbon bearing material such as coal or coke is added to the belt 6 from a bin 7 in an amount sufficient to bring the carbon content of the final raw material to between 3 and 9% by weight carbon content. A suitable binder such as Portland Cement is added from a bin 8 to the conveyor 6 in an amount ranging between 0 and 5% by weight depending on the binding capability of the dust catch material. The apparatus may include additional bins such as that indicated at 9 for recycled material and a bin indicated at 10 for additives, if chemical adjustment is considered necessary by the operator.

The dust catch carbon bearing material and binder are transported by conveyor 6 to apparatus for combining the solid materials with water in a quantity of 15 to 20% and forming the mixture of water, dust catch, coke or coal and cement into nodules. In FIG. 1, this apparatus is illustrated as a pug mill 15 and extruder 16. The pug mill 15 mixes and conveys the material to an extruder 16 where extrusions or nodules are formed. The extruded material is then supplied to a tray dryer generally indicated at 18. The dryer is supplied with heated drying gas through conduit 19. Exhaust gas from the dryer is supplied through a conduit 20 and fan 21 to a high efficiency dust collector 22. Dust from the collector 22 is removed at 23 and may be supplied to the recycle bin 9. The dried nodules are then sized to obtain a feed material having a selected size range. In the embodiment illustrated in FIG. 1, the sizing of the nodules or extrusions is carried out by supplying the nodules to a roll crusher 25. Crushed material then goes through a series of screens generally indicated at 26 where a desired size material is removed at 27 and supplied as feed material to a bucket elevator 28. Oversized material is taken off at 29 for recycle to the roll crusher 25. Undersized material is removed at 30 for recycle to bin 9.

The conveyor 6, the pug mill 15, extruder 16, tray dryer 18, crusher 25, and screen system 26 together constitute a feed preparation system generally indicated at 12.

In the preferred form, the extruder produces product having a size on the order of ½" to 1" extrusions. The extrusions are dried on tray dryer 18 to produce a hardened nodule discharged at 24. In the preferred method, the dried nodules are sent to storage for a period of 1 to 3 days for aging to allow the binder to increase the pellet or nodule strength. The stored or aged pellets may then be supplied to the roll crusher 25 rather than directly from discharge 24 as illustrated.

In the preferred form, the sizing equipment provides a dried product having a size range of 4 mesh by 14 mesh for feed to bucket elevator 28. Oversized material is returned to the roll crusher while material of −14 mesh size is returned to the recycle bin 9.

Figure 2:
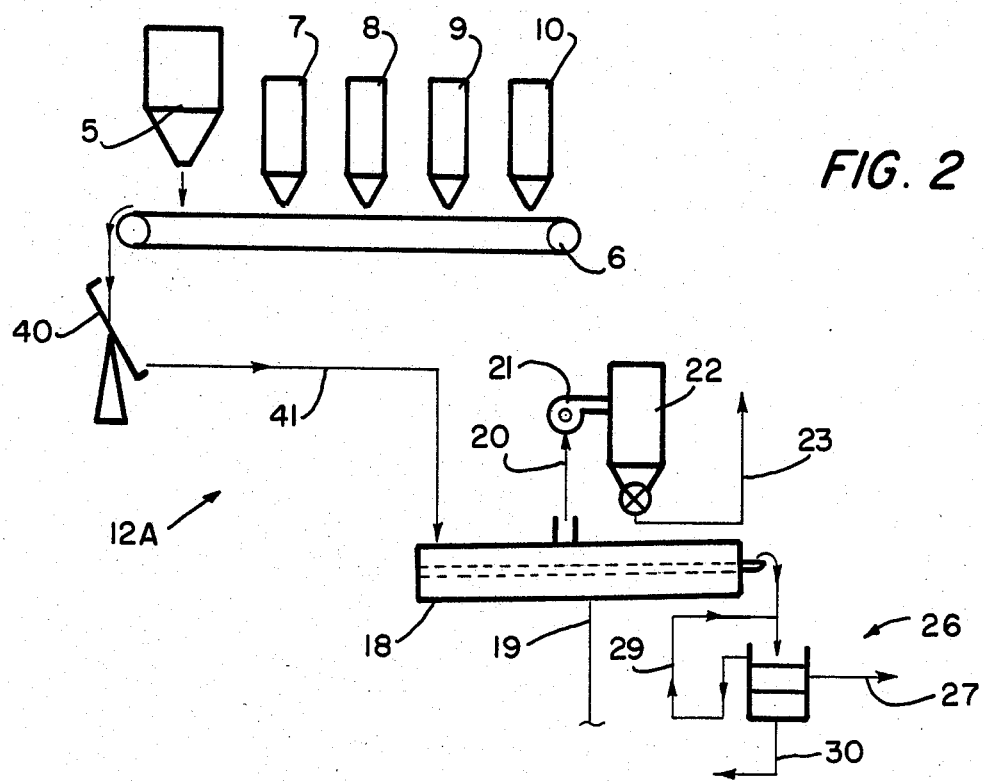
FIG. 2 is a diagramatic view of a portion of a modified apparatus for carrying out the process of the present invention.

An alternate feed preparation system is illustrated in FIG. 2 and generally designated at 12A. In this feed preparation system, dust catch, carbon and cement are supplied through similar bins 5, 7 and 8 to a common conveyor 6 in the manner of FIG. 1. The conveyor feeds the material to a disk or drum pelletizer 40. Water in the 15% to 20% range is added on the disk or drum pelletizer 40 with a pelletizer controlled to produce a nodule or pellets having size range of 4×14 mesh. Wet pellets leave the pelletizer 40 and are transported as indicated at 41 to a tray dryer 18. The tray dryer is supplied with heated drying gas at 19 and spent drying gas is exhausted through conduit 20, fan 21 and high efficiency dust collector 22 in the manner of FIG. 1. Dust is returned at 23 to bin 9. The discharge from dryer 18 may go to a screen illustrated at 26 with oversize being supplied at 29 to a small crusher (not shown) and undersize material being returned at 30 to bin 9. Properly sized feed material is discharged at 27 for further processing. As in the case of FIG. 1, it is preferred that the dried pellets be sent to storage for 1 to 3 days.

Figure 3:
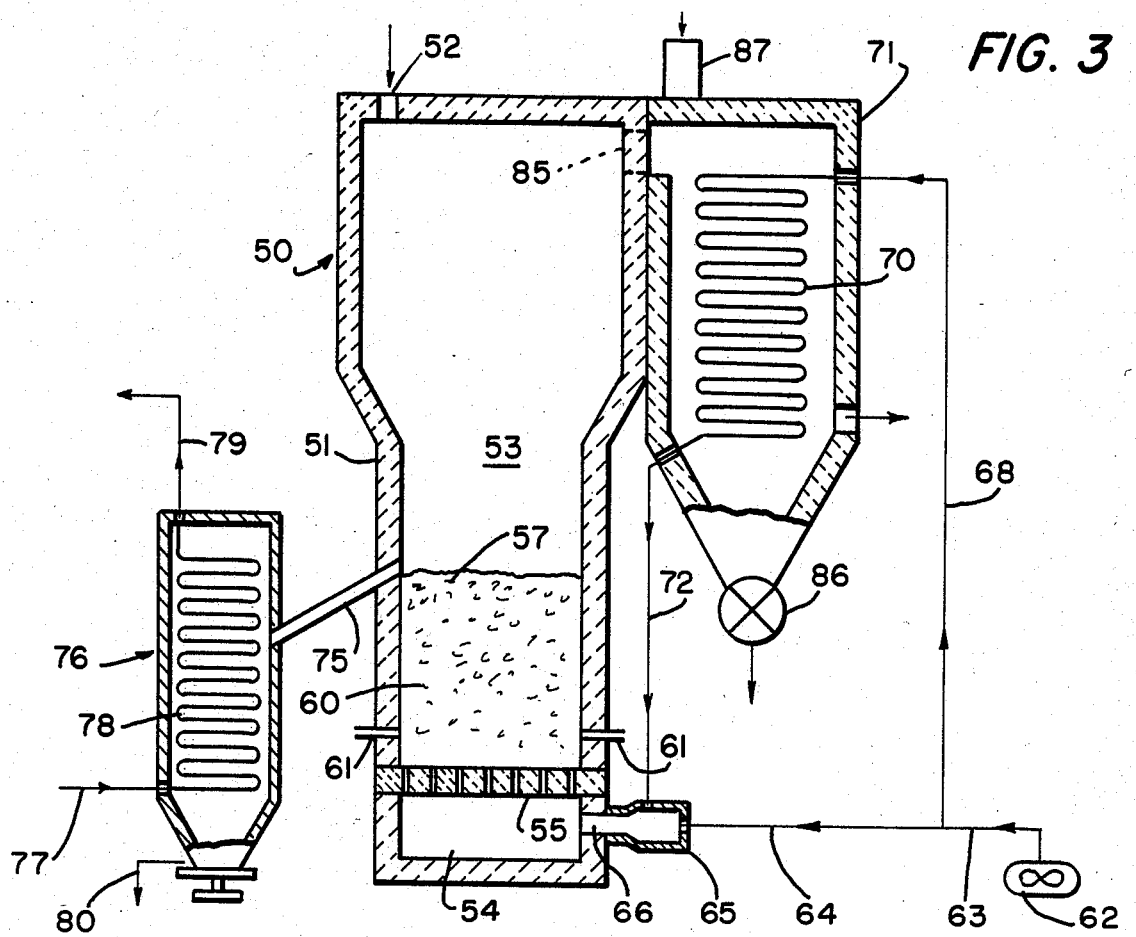
FIG. 3 is a diagramatic view on an enlarged scale of the pyroprocessing portion of apparatus utilized for carrying out the process of the present invention.

Referring again to FIG. 1, properly sized material is supplied by bucket elevator 28 to a storage bin 45. Material is metered out of the bin 45 and conveyed as through line 46 to a fluidized bed reactor generally indicated at 50 for thermal processing. Referring to FIG. 3, the fluid bed reactor 50 includes a vessel 51 having an inlet 52 for the dried and sized feed material from the feed preparation system 12 or 12A. The vessel 50 is divided into an upper thermal processing chamber 53 and a lower plenum chamber 54 by means of a gas permeable grid 55. Suitable nozzles may be included in the grid 55. Air under pressure or fluidizing gas is supplied to the plenum chamber 54 for passage upwardly through the grid 55 at a velocity in the range of six to ten feet per second and a bed 57 of feed material to thereby establish and maintain a highly active fluidized bed 60 of feed material. Fuel is supplied through nozzles 61 to the bed 60 for combustion within the fluidized bed 60 within the vessel 51.

The air supply system of the present invention is illustrated in FIG. 3 and includes a blower 62 having its outlet 63 connected via conduit 64 to an auxilliary air heater 65 for connection through inlet 66 to the plenum 54. The output 63 is also connected to a conduit 68 which is connected to a heat exchanger 70 within a knock-out chamber 71. Heat exchanger 70 is connected by conduit 72 to the air heater chamber 65.

Typical feed materials are illustrated in Table 1 wherein a feed material using coal and a feed material using coke are shown.

Feed material is supplied through inlet 52 to the vessel 51 and the bed 60 of material 60. Fuel is burned in the bed 60 to maintain temperature at cement clinkering temperatures in a range of approximately 2300° F. to 2380° F.

As material is supplied to the fluidized bed 60, product is discharged through overflow conduit 75 to an indirect cooler 76. Material discharged from vessel 51 is by displacement so that the rate of discharge of material depends upon the rate of feed of material to the vessel. Material retention time should be on the order of between one and two hours. The potential reactions within the fluidized bed reactor include the following:

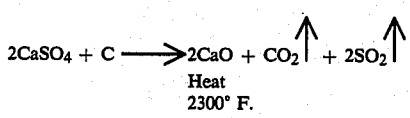

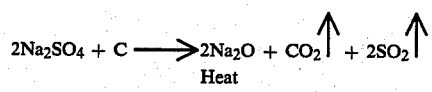

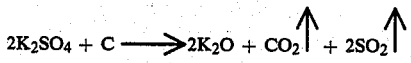

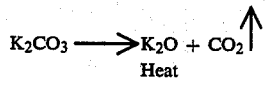

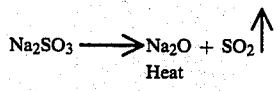

Product discharged through conduit 75 and supplied to heat exchanger 76 is cooled by indirect heat exchange with cooling air supplied from a source such as a blower (not shown) through conduit 77 to heat exchanger coils 78. Air is heated in the heat exchanger 76 and discharged from the coils 78 through conduit 79. As illustrated in FIG. 1, conduit 79 is flow connected to conduit 19 so that the thus heated cooling air is utilized for drying materials in the tray dryer 18. Product is discharged from cooler 76 through outlet 80. Depending upon the raw material and the temperature of bed 60, a product may be either cement clinker or an intermediate product.

Utililzing feed material of Table 1, the product produced will have an analysis as shown in Table 2, it should be noted that in the preferred form carbon is added to the raw material in the form of pulverized coal or coke. This carbon serves to supply a portion of the fuel required in the fluidized bed 60 and importantly serves to complete the reaction as illustrated above. The localized reduction of alkali with the pellets is accomplished by the addition of 3 to 9% carbon.

The product leaving the reactor has a temperature on the order of 2300° to 2380° F. The indirect shaft cooler 76 will preheat the air for the tray dryer to a temperature on the order of 500° to 700° F. With temperatures as indicated in the fluid bed, alkali and sulfur compounds within the feed material are volitalized and carried out of the reactor by the spent fluidizing gases. The spent fluidizing gases will also entrain a certain part of the incoming feed and some fine product. This material will be discharged through an outlet 85 into knock-out chamber 71. In the knock-out chamber 71, the elutriated fine incoming feed and fine product will be separated from the gases in which it is entrained. This product will be discharged through a suitable airlock 86.

A vent or bleed air system 87 is flow connected to the knock-out chamber 71 to add oxygen to the spent fluidizing gases. The off-gases leaving the reactor will pass through the heat exchanger 70 to preheat fluidizing gas from blower 62 to a temperature in the range of 1000° to 1600° F. once the system is in full operation. Prior to the time the system is in full operation, the air heater 65 may be required. In the preferred form, the off-gas analysis from the reactor should be controlled at less than 2% oxygen, with a preferred form of approximately 1% oxygen.

With the addition of oxygen to the knock-out chamber 71, through bleed air inlet 87 the following reactions take place in the exhaust gas flow:

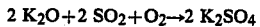

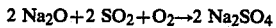

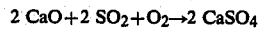

As can be seen, the addition of oxygen serves to not only cool the gas, to permit its collection in a high efficiency dust collector, but also to complete the reaction and precipitate the alkali and sulfur compounds in a concentrated form. As shown in FIG. 1, these gases are supplied through conduit 88 to a high efficiency dust collector 89 with the solid material being separated and discharged at 90 and gas being discharged to atmosphere through fan 91 and stack 92. Table 3 gives the analysis of the by product discharged from the dust collector 89 when using the feed material of Table 1.

With the present invention, it is possible to reduce alkali and sulfur compounds in the following ranges.

| | |
|---|---|
| K$_2$O | 75-95% |
| Na$_2$O | 50-75% |
| SO$_3$ | 70-95% |

These reductions are illustrated in Table 4 using the feed material of Table 1. The off-gas system will produce a potential by-product with high alkali compound materials in the following ranges.

| | |
|---|---|
| K$_2$SO$_4$ + K$_2$CO$_3$ | 35-80% |

-continued

| | |
|---|---|
| $Na_2SO_4 + Na_2CO_3$ | 5–20% |

Typical dust catch mixes affect material after the addition of coal or coke are shown in Table 1. This material was prepared into 4×14 mesh sizing in a manner described and fired in a fluidized bed reactor with the product produced as shown in Table 2. The analysis of the dust collector by-product is shown in Table 3. When viewing these Tables it can be seen that the high concentration of alkali and sulfur compounds contained in the raw mix has been substantially reduced to produce an acceptable cement clinker with a reduction in alkali and sulfur compounds as indicated in Table 4. The dust catch for the system has a significant increase in the sulfur and alkali compounds particularly the potassium.

From the foregoing it can be see that the objects of the present invention have been carried out. A economical system for feeding cement plant dust wherein previously non-useable material has been converted either into a cement clinker or into a product which can be fed to the conventional cement clinkering operation. In some instances, it will be possible to directly cement clinker although some addition of corrective materials may be required. In other instances the product of the fluid bed will be sent to a conventional cement clinker processing plant. The high concentration of alkalis and sulfurs in the product can be utilized for other applications such as fertilizers. Materials such as coal water and raw materials normally used in a cement plant are used in the process. Addition of unusual or special materials is not required.

It is intended that the foregoing be a description of a preferred embodiment and that the invention be limited solely by that which is within the scope of the appended claims.

TABLE 1

| FEED MATERIAL | Mix #1 Coal Added | Mix #2 Coke Added |
|---|---|---|
| $SiO_2$ | 15.04 | 15.33 |
| $Al_2O_3$ | 3.04 | 2.96 |
| $Fe_2O_3$ | 2.02 | 1.85 |
| CaO | 39.95 | 41.31 |
| MgO | 2.16 | 2.24 |
| $K_2O$ | 2.08 | 2.04 |
| $Na_2O$ | 0.47 | 0.47 |
| $SO_3$ (Total) | 7.72 | 8.16 |
| $P_2O_5$ | 0.07 | 0.07 |
| $TiO_2$ | 0.20 | 0.19 |
| $Mn_2O_3$ | 0.03 | 0.03 |
| C | 6.44 | 7.09 |
| $CO_2$ | 15.09 | 14.32 |
| Loss @ 500° C.* | 8.74 | 8.13 |

*LOI @ 500° C. includes carbon which goes off at that temperature.

TABLE 2

| PRODUCT | Mix #1 Coal Added | Mix #2 Coke Added |
|---|---|---|
| $SiO_2$ | 23.64 | 23.74 |
| $Al_2O_3$ | 4.89 | 4.68 |
| $Fe_2O_3$ | 3.27 | 3.00 |
| CaO | 63.72 | 64.15 |
| MgO | 3.36 | 3.35 |
| $K_2O$ | 0.18 | 0.16 |
| $Na_2O$ | 0.17 | 0.15 |
| $SO_3$ (Total) | 0.35 | 0.33 |
| $P_2O_5$ | 0.09 | 0.08 |
| $TiO_2$ | 0.31 | 0.30 |
| $Mn_2O_3$ | 0.04 | 0.04 |
| Calculated Cement Compounds | | |
| $C_3S$ | 42.1 | 45.0 |
| $C_2S$ | 36.2 | 34.2 |
| $C_3A$ | 7.4 | 7.3 |
| $C_4AF$ | 9.9 | 9.1 |
| Free Lime | 1.81 | |
| Total Alkali as $NaO_2$ | 0.29 | 0.26 |
| Silica Ratio | 2.89 | 3.09 |

TABLE 3

| DUST COLLECTOR BIPRODUCT | Mix #1 Coal Added | Mix #2 Coke Added |
|---|---|---|
| $SiO_2$ | 3.29 | 4.13 |
| $Al_2O_3$ | 0.64 | 0.77 |
| $Fe_2O_3$ | 0.37 | 0.41 |
| CaO | 7.91 | 9.75 |
| MgO | 0.45 | 0.53 |
| $K_2O$ | 40.04 | 40.54 |
| $Na_2O$ | 5.59 | 3.82 |
| $SO_3$ Total | 39.09 | 33.81 |
| $P_2O_5$ | 0.03 | 0.04 |
| $TiO_2$ | 0.16 | 0.13 |
| $Mn_2O_3$ | 0.03 | 0.04 |
| Loss @ 500° C. | 2.40 | 6.55 |
| Calculated Compounds | | |
| $K_2SO_4$ | 71.76 | 62.08 |
| $K_2SO_3$ | 2.09 | 10.17 |
| $Na_2SO_4$ | 11.89 | 8.12 |
| $CaSO_4$ | 0 | 0 |
| $K_2CO_3$ | 0 | 0 |
| Total Alkali Salts | 85.74 | 80.46 |

TABLE 4

| | Feed | Loss Free | Clinker | % Reduct |
|---|---|---|---|---|
| Coal Mix | | | | |
| $K_2O$ | 2.08 | 3.30 | 0.18 | 94.5 |
| $Na_2O$ | 0.47 | 0.75 | 0.17 | 77.3 |
| $SO_3$ | 7.72 | 12.24 | 0.35 | 97.1 |
| Proc. Loss | 37.00 | — | — | — |
| Coke Mix | | | | |
| $K_2O$ | 2.04 | 3.18 | 0.16 | 95.0 |
| $Na_2O$ | 0.47 | 0.73 | 0.15 | 79.5 |
| $SO_3$ | 8.16 | 12.75 | 0.33 | 97.4 |
| Proc. Loss | 36.00 | | | |

I claim:

1. A process of treating dust catch from a cement manufacturing operation to produce cement clinker and enriched alkali and sulfur compounds comprising the steps of:
   adding water and carbon in the range of 3% to 9% by weight to the dust catch and adding material to chemically adjust the dust catch to produce a cement clinker having the desired chemical analysis to thereby produce a mixture;
   forming the mixture into nodules;
   drying the nodules;
   sizing the nodules to obtain a feed material having a selected size range between approximately 4 mesh and 14 mesh;
   supplying the feed material to a vessel;

passing air upwardly through the material at a rate of 6 to 10 feet per second to maintain the material as a fluidized bed within the vessel;

supplying fuel to the vessel for combustion in the fluidized bed whereby the bed is maintained at temperatures in the range of approximately 2300° to 2380° F. to produce a cement clinker and enriched alkali and sulfur compounds are volatilized;

discharging cement clinker from the vessel;

discharging combustion gas and enriched volatilized alkali and sulfur compounds from the vessel;

maintaining discharged combustion gases at approximately one percent oxygen; and precipitating the enriched alkali and sulfur compounds by adding air to the discharged combustion gas.

2. A process of treating dust catch from a cement manufacturing operation according to claim 1 wherein cement is added to the dust catch as a binder in a range of up to 5% by weight.

3. A process of treating dust catch from a cement manufacturing operation according to claim 1 further comprising the step of cooling product discharged by displacement from the vessel by indirect heat exchange with ambient air whereby the ambient air is heated, and using the thus heated ambient air for drying the nodules.

4. A process of treating dust catch from a cement manufacturing operation according to claim 3 further comprising the step of preheating the air for combustion by indirect heat exchange with combustion gases discharged from the vessel.

5. A process of treating dust catch from a cement manufacturing operation according to claim 2 wherein the step of sizing the nodules includes crushing the nodules and screening the crushed nodules to obtain a feed material having a selected size range.

6. A process of treating dust catch from a cement manufacturing operation according to claim 5 wherein said nodules are formed by pelletizing the mixture.

7. A process of treating dust catch from a cement manufacturing operation according to claim 5 wherein said nodules are formed by extruding the mixture.

8. A process of treating dust catch from a cement manufacturing operation according to claim 5 further comprising the step of ageing the nodules after the step of drying and before the step of sizing.

* * * * *